United States Patent
Flynn et al.

(10) Patent No.: US 6,618,747 B1
(45) Date of Patent: Sep. 9, 2003

(54) ELECTRONIC COMMUNICATION DELIVERY CONFIRMATION AND VERIFICATION SYSTEM

(76) Inventors: Francis H. Flynn, 14 Wave Crest Dr., Islip, NY (US) 11751; Jeffrey Foran, 1127 Commonwealth Ave., Apt. 1, Allston, MA (US) 02134

( * ) Notice: Subject to any disclaimer, the term of this patent is extended or adjusted under 35 U.S.C. 154(b) by 0 days.

(21) Appl. No.: 09/448,365

(22) Filed: Nov. 23, 1999

Related U.S. Application Data

(60) Provisional application No. 60/109,934, filed on Nov. 25, 1998.

(51) Int. Cl.[7] ............................................. G06F 15/16
(52) U.S. Cl. ....................................... 709/206; 709/203
(58) Field of Search ................................ 709/203, 206, 709/217; 345/744, 752; 379/93.24

(56) References Cited

U.S. PATENT DOCUMENTS

| | | | |
|---|---|---|---|
| RE34,954 E | | 5/1995 | Haber et al. |
| 5,426,594 A | * | 6/1995 | Wright et al. ................ 709/206 |
| 5,509,071 A | | 4/1996 | Petrie, Jr. et al. |
| 5,675,733 A | | 10/1997 | Williams |
| 5,748,738 A | | 5/1998 | Bisbee et al. |
| 5,771,355 A | * | 6/1998 | Kuzma ........................ 709/232 |
| 5,793,972 A | * | 8/1998 | Shane ......................... 709/219 |
| 5,850,520 A | | 12/1998 | Griebenow et al. |
| 5,903,723 A | | 5/1999 | Beck et al. |
| 5,930,471 A | * | 7/1999 | Milewski et al. ............ 709/204 |
| 6,018,774 A | | 1/2000 | Mayle et al. |
| 6,275,848 B1 | * | 8/2001 | Arnold ........................ 709/206 |
| 6,332,164 B1 | * | 12/2001 | Jain ............................. 709/235 |
| 6,385,655 B1 | * | 5/2002 | Smith et al. ................. 709/232 |
| 6,477,243 B1 | * | 11/2002 | Choksi et al. .......... 379/100.06 |

FOREIGN PATENT DOCUMENTS

WO        WO 02/25508 A2 *  3/2002

OTHER PUBLICATIONS

Gralla, P., How the Intranets Work, Ziff–Davis Press, pp. xi & 122–125, 1996.*

Stallings, W., Data and Computer Communications, Prentice–Hall, pp. 728–730, 1997.*

Lowe, D., Client/Server Computing for Dummies, IDG Books Worldwide, pp. 125–128 and 136–137, 1995.*

Gralla, P., How the Internet Works, Special Edition, Ziff–Davis Press, pp. 76–86, 110–111 and 122–125.*

Microsoft Press Computer Dictionary, 3rd ed., Microsoft Press, pp. 34–35, 1997.*

Klensin et al; Request for Comments: RFC 1869 (Nov. 1995) available at http://www.gssnet.com/rfc/rfc1869.htm, pp. 1–11.

Freed; Request for Comments: RFC 2034 (Oct. 1996) available at http://www.gssnet.com/rfc/rfc2034.htm, pp. 1–5.

Mosher, Sue; Microsoft Exchange User's Handbook; Duke Press (1997); pp. 220, 285, 288.

Blue Mountain Arts. Frequently Asked Questions. www-.bluemountain.com/help/FAQ2.html, pp. 5–6 & 11.

* cited by examiner

*Primary Examiner*—Andrew Caldwell
(74) *Attorney, Agent, or Firm*—Collard & Roe PC

(57) ABSTRACT

The present invention provides a system and a method for a user to verify receipt of an electronic communication such as an email message by an intended recipient. Instead of forwarding the email to the intended recipient(s), (e.g. as a normal SMTP server might,) the invention sends a notification message of a posted email to the intended recipient(s). The email and attachments are each saved at a unique call address on a server such as for example a web server. At least one unique address is provided for each of the intended recipients that points to the location of the contents of the original email. When attachments accompany the email, each attachment is also assigned an address that is unique for each intended recipient. The intended recipient is notified of the call addresses for collecting the email and attachments. When the recipient downloads or collects the email and attachments from their respective addresses, the invention detects information regarding the downloaded email and notifies the sender that the email was retrieved. This information may be stored in a back-end database for ease of access and management.

6 Claims, 2 Drawing Sheets

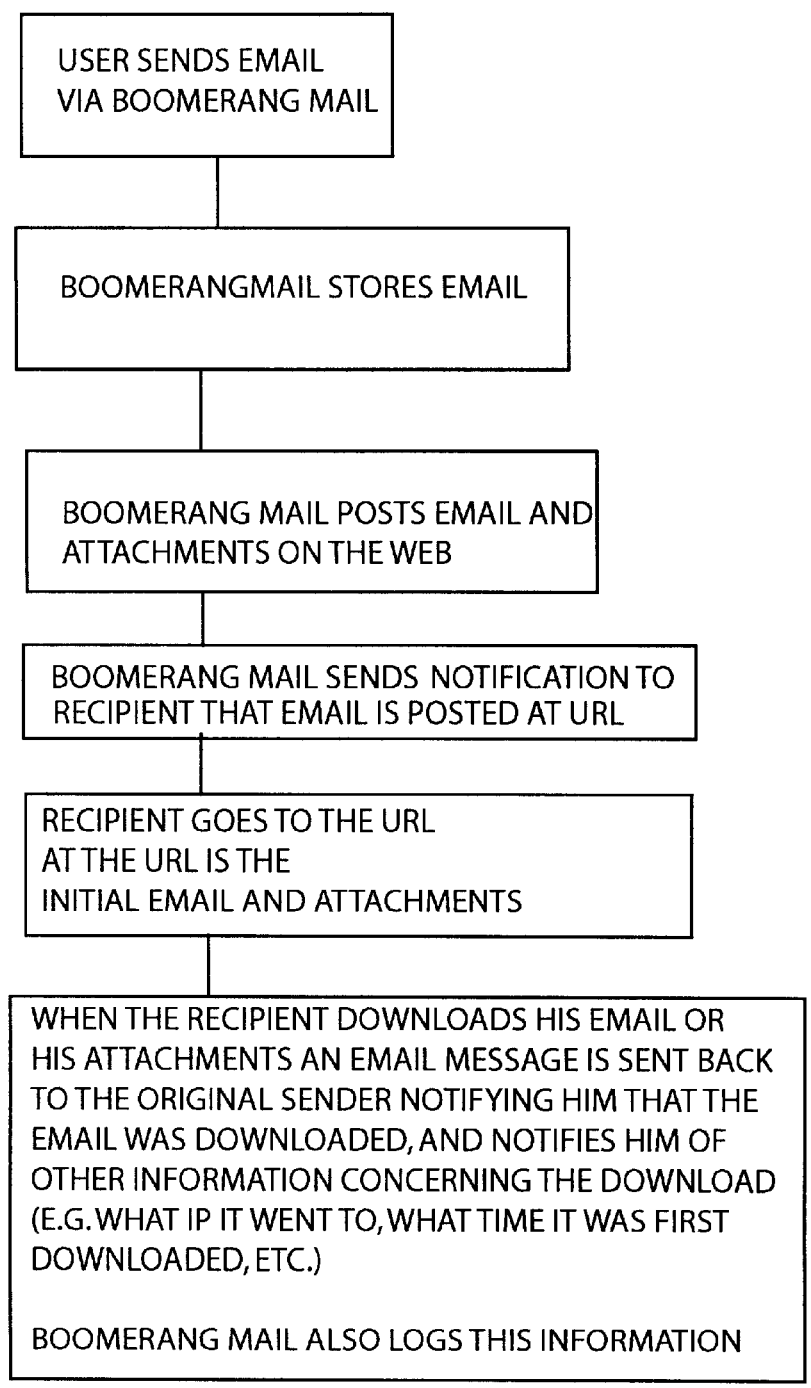

ELECTRONIC COMMUNICATION DELIVERY CONFIRMATION AND VERIFICATION SYSTEM

This application claims the benefit of U.S. Provisional Patent Application 60/109,934 filed Nov. 25, 1998, entitled "An Electronic Communication Delivery Verification System", the content of which is incorporated herein by reference in its entirety.

FIELD OF THE INVENTION

This invention relates generally to electronic communications and, more particularly, to a method by which a sender of an electronic communication can validate receipt of an electronic communication by an intended receiver.

BACKGROUND OF INVENTION

Electronic communication, such as for example e-mail, is a form of written data, a data-string, that is transported electronically such as on the Internet. Specific protocols governing certain aspects of the way one machine electronically passes information in the form of data-strings to another machine have been established to facilitate communication between different brands of machines running different software. Various protocols have been developed to standardize the methods by which data are transported from one computer to another computer such as on Local Area Networks (LAN), Wide Area Networks (WAN), and the Internet. This standardization was developed to allow computers and computer programs from differing commercial sources to be as compatible as possible.

The Internet Protocol (IP) that directs or routes a data-string from one computer to another is what is called a best efforts protocol, a method that involves a series of computer instructions that attempts to deliver a data-string to its intended location, but that does not guarantee its delivery. This means that the data-string can get lost or damaged before reaching the intended recipient. The Transmission Control Protocol (TCP) works in conjunction with IP in an attempt to ensure that data-string is sent error-free, complete, and in the proper sequence. However, it does not insure correct delivery. The Simple Mail Transfer Protocol (SMTP) provides for standardized error messages to be issued when a fault occurs in transmission. Standardized status codes (such as described in Kleinsin, et al; Network Working Group Request for Comments: 1869; STD: 10: Obsoletes: 1651; Category: Standards Track; November, 1995) provide information for generating error messages that indicate whether or not a computer in the net or network of computers used to pass the data-string has been unable to do so. Such an Error message is exemplified by:

"----The following addresses had delivery problems ----
<nosuchuser@dbc.mtview.ca.us>
(Mailbox "nosuchuser" does not exist)"

When delivery occurs a message such as "---Mail was successfully relayed to the following addresses---" may be provided. However, no information is provided by through the use of these protocols via the respective protocol server regarding whether the intended recipient has retrieved the email and/or the attachments.

Business people and others need to verify that an important transaction once sent has been received by the intended recipient. The main obstacle to widespread commercial use of electronic communications, such as for example email and email attachment, is the lack of the ability to verify that the email and/or attachment was received by the intended recipient. Email must be sent on unsecured pathways, pathways where the email can be mis-directed, lost, and/or altered. It is highly desirable to the sender to be able to verify that the intended recipient has received an important email. It is also desirable to the sender to know that the intended information in electronic message was received as written or sent.

SUMMARY OF INVENTION

The instant invention comprises a software application for use with a computer that is part of or has access to an electronic network including at least one other computer and a method for use of the software application that provides a sender of an electronic communication such as an email, a receipt for verification of delivery of the electronic communication by a recipient. The sender may use a conventional email program or the instant invention to compose the email. The email ("electronic mail") may have graphics and/or attachments, each of which is termed a data-string herein. Unlike a conventional email program, each data-string is directed to a unique electronic address, such as for example an IP (Internet Protocol) address or hostname, on a computer that is independent of the recipient's computer. Only a notification that an email or an email plus an attachment is awaiting retrieval is sent to the recipient and appears at their computer. The notification provides the recipient with the unique electronic retrieval location(s), such as a unique IP address for an email message or two unique email addresses for an email accompanied by an attachment, located on a mail server to which the recipient can direct their computer using software to retrieve the data-string(s). Each recipient is provided with a unique address to retrieve their email even when the recipient is merely receiving a copy of an email that has been broadcast to a number of recipients. In one embodiment, a computer having access to the Internet is used as the mail server. In an alternate embodiment, the mail server is located on a LAN (local area network) such as for example for use for infra-office email within a business. Upon retrieval of the data-string, the sender is notified electronically via email and information regarding the retrieval transaction is stored in a back-end database.

For example, when the data-string is sent via the Internet, the user who is the sender composes an email message and attaches any text or images as required. Once the message is composed and sent, the instant invention parses that data-string while determining the appropriate recipients. The parsed data-string is placed on the World Wide Web (also termed the Web or the Internet or the Net) by waiting until at least one appropriate data-string transfer and retrieval means, such as for example a HyperText Transport Protocol (http) call provides an available address at a port of a computer the instant invention is monitoring. More addresses will be needed to match data-string to address when, for example, a single email data-string is being communicated to a number of different recipients. There is exactly one unique address that will access the data-string for each specific recipient targeted to receive the data-string unless the data-string has more than one component such as a plurality of attachments. Concurrent with posting the sender's data-string on a computer connected to a network of computers such as the Web, the instant invention sends out a notice via email that the recipient has a posted data-string or email awaiting retrieval. This message is simply a notice of the availability of the electronic communication that provides an electronic address such as a Uniform Resource Locator (URL) pointer to where the email is posted on the Web. One URL points to a single location that is uniquely assigned for each component of the data-string for each recipient using the instant invention. Alternatively, the posted email may have a URL that allows it to call for its accompanying attachment ie. the email and its accompanying documents may be electronically interlinked.

When the recipient of the email message links to a data-string via the URL pointer, the instant invention identifies the recipient by their unique IP address or hostname. As the recipient retrieves their posted email message and attachments, the instant invention notifies the sender that the posted electronic communication has been retrieved by a person at the IP address corresponding to that of the intended recipient. This notice includes the recipient's unique IP address or hostname and a time, date stamp indicative of when the posted electronic communication was retrieved. A copy of the posted electronic communication may also be included in the notice.

An embodiment of an inventive method for verifying receipt of an electronic communication at an intended electronic address is provided by the following example comprising the steps of:

1. Sending an electronic communication comprising a data-string.
2. Posting that data-string to a unique URL on a computer connected to the Web for each unique data-string.
3. Notifying the recipient at a recipient IP address via email that they have an electronic communication awaiting retrieval at a specified unique Web URL address.
4. Validating the retrieval of the sender's electronic communication by a recipient at an intended IP address by recognizing the recipient's IP address or hostname when they electronically request delivery of their electronic communication.
5. Notifying the sender when the IP address or hostname match the intended IP address or hostname that the electronic communication has been retrieved and optionally passing the validating information into a back-end database.

The invention has four distinct interfaces with users: two sender interfaces and two recipient interfaces. The first sender interface is an outgoing message interface that is implemented to communicate with any SMTP client having an outgoing server that is configurable to a given IP address or hostname. This interface is not limited to what is generally considered client type programs such as for example email programs such as Eudora®. The invention could interface at the first sender interface with any large server that delivers email using SMTP where the outgoing delivery IP address is capable of being configured. The first recipient interface is implemented to accommodate use with any system or application that handles delivery of electronic messages to a given recipient. This includes all POP clients, all Web-based email clients as well as any test-based email delivery and retrieval systems. The second part of the recipient interface is the data-string retrieval interface. This interface is implemented to communicate only via http (with any http browser in the embodiments described. However, the recipient interface can be implemented to accommodate any data-string retrieval mechanism. The second sender interface is the incoming interface that notifies the sender when the data-string is retrieved. In one embodiment, it is implemented as an email delivery notification and works with any system that handles delivery of email to a given recipient. This includes all POP clients, all Web based clients, as well as any text-based email retrieval systems.

In one embodiment, the instant invention communicates (also termed "interfaces") with electronic communications program, such as for example email programs Eudora®, First Class Client®, and Hot Mail®. It can be used for electronic communication on the Internet or an Intranet, within a Local Area Network (LAN) or a Wide Area Network (WAN) environment. The invention provides a plurality of fields for data in the back-end database. Full search, browse, edit, and contact management functions are included in order to provide complete access to the stored data. Remote access functions may be configured. Thus, verification, authentication, and ease of data management are provided. Advantageously, the flow of electronic communications such as email can be controlled and documented.

BRIEF DESCRIPTION OF THE DRAWINGS

FIG. 2 provides a flow chart of the pathway and components used to transmit and verify an electronic communication.

DETAILED DESCRIPTION OF THE PREFERRED EMBODIMENT

Figure 1:
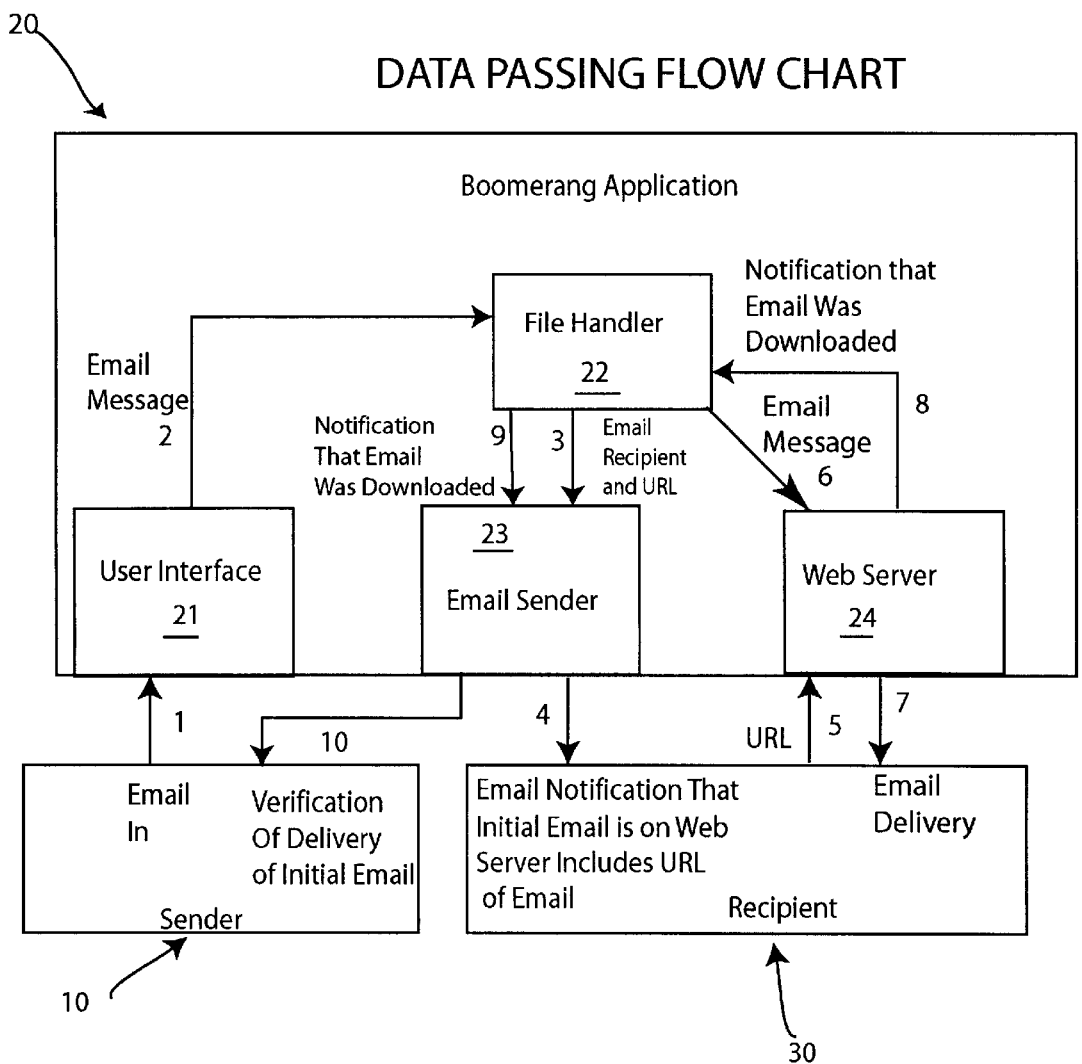
FIG. 1 provides a block diagram of the system and method by which an electronic communication in the form of data can be routed by a sender to a specific receiver and by which the sender can be notified of the receipt of the electronic communication by the specific receiver.

The instant invention provides a system and method for confirmation of receipt of an electronic communication by an IP address or hostname accessible recipient ("the recipient"). The invention is a software application that allows the sender of an electronic communication to use the electronic communication program of their choice, such as for example an email program like Eudora®, to generate a specific data-string or message, send it to a specific recipient, and verify that the specific recipient received the data-string. Optionally, the application may provide a copy of the retrieved data-string so that the sender can determine if the data-string was received as sent, unaltered. Transmission of electronic information involves passing data in the form of a data-string from one computer to another through the use of computer programs that convert user instructions into instructions that a computer can understand. The data-string is then passed through electronic means, such as for example by telephone wires or cables, from one computer to another computer. These computers form a network of computers that is variously referenced to as a "Net" or "Web".

The invention has four distinct interfaces with users: two sender interfaces and two recipient interfaces. The first sender interface is an outgoing message interface that is implemented to communicate with any SMTP client having an outgoing server that is configurable to a given IP address or hostname. This interface is not limited to what is generally considered client type programs such as for example email programs such as Eudora®. The invention could interface at the first sender interface with any large server that delivers email using SMTP where the outgoing delivery IP address is capable of being configured. The first recipient interface is implemented to accommodate use with any system or application that handles delivery of electronic messages to a given recipient. This includes all POP clients, all Web-based email clients as well as any test-based email delivery and retrieval systems. The second part of the recipient interface is the data-string retrieval interface. This interface is implemented to communicate only via http (with any http browser in the embodiments described. However, the recipient interface can be implemented to accommodate any data-string retrieval mechanism. The second sender interface is the incoming interface that notifies the sender when the data-string is retrieved. In one embodiment, it is implemented as an email delivery notification and works with any system that handles delivery of email to a given recipient. This includes all POP clients, all Web based clients, as well as any text-based email retrieval systems.

Referring now to FIG. 1 which illustrates a first embodiment of the instant invention, when an electronic communication sender is distanced from a recipient and the Internet is used to send the electronic communication, a sender illustrated by box "Sender" 10 enters information, such as for example an email message and an attachment to that email message, into a computer via the desired electronic communications program that has been loaded on that sender's machine. A message data-string is generated. This message data-string is then processed by the instant invention which has been loaded on the sender's machine as follows. The message data-string is parsed into an html-readable file and electronically sent via a user interface 21 to a file handler 22 where the message data-string is stored at a unique http call address assigned to each of the intended recipients. Assignment of the unique http call address(es) is determined by the instant invention which monitors a port for incoming TCP connections. If the electronic communication was an email that included an attachment, then a unique address is assigned to each of the parsed original email message and original attachment html-readable files. Concurrently upon receiving a file for storage, the file handler also generates a unique data-string for each stored file that is a notification message that is delivered to each unique recipient. This notification data-string informs each recipient that one unique message data-string has been stored for them at the indicated unique http call address. This notification data-string is sent via a Web Server 24 to the intended unique recipient, represented by box "recipient" 30.

The notification data-string may have additional information added to it prior to its delivery to the recipient. For example, the electronic communication sender's name and/or email address may be added. Or, an advertisement may be added to the notification message data-string.

The notification message data-string is then sent to the recipient's Post Office Protocol (POP) server and is read by the recipient at the notified IP address or hostname address indicated by the notification message when they open their email application. If the recipient wishes to read the posted electronic communication, the recipient enters the unique http call address that has been sent in the notification message data-string and retrieves the unique message data-string from the Web Server 24, if the recipient has entered the correct http call address. Both an email and its associated attachment(s) can be provided with unique call addresses or the email and its attachment(s) can be linked so that the entire communication is available using one call address. In a first embodiment for each stored message data-string retrieved, be it email or attachment, the Web server sends a notification of receipt message that informs the sender that the message data-string was retrieved by the recipient at the address receiving the notification of available email and http call address. This notification of receipt message is electronically transmitted to the sender at approximately the same time that the recipient is sent (retrieves) the stored message data-string. The notification of receipt message is sent via the file handler and the email sender to the IP or hostname address of the sender ("original sender") and includes information concerning the downloading of the message data-string by the recipient, such as for example, the time it was first downloaded (time and date stamp), the address to which it was sent at downloading, and other relevant information. A compressed copy of the message received by the recipient may also be provided to the sender.

If the original electronic communication comprises an email and an attachment, then in one embodiment, the recipient is notified that an electronic communication is located at http call address 1 (the email) and at http call address 2 (the attachment). The recipient retrieves the electronic communications at each address and notification of each separate retrieval is provided to the sender as described above. Alternatively, the notification message may contain a link to the address for the email and to the address for the attachment. Notification of receipt may then be sent as each data-string is retrieved or notification of receipt may be sent only once when all associated electronic communications have been retrieved.

FIG. 2 provides an embodiment of a method of confirming that an electronic communication was received by a recipient. This embodiment exemplifies electronic communication verification when using the Internet to transport the electronic communication. Referring now to FIG. 2, a flowchart of the steps used to provide verification to a sender that receipt of a electronic communication by a recipient has occurred is provided. The sender installs the software, the inventive computer program for generating electronic mail receipts, on their computer and electronically moves through a set-up interface. The sender generates an electronic communication such as an email. The sender enters the email address of the intended recipient or recipients thus providing an addressed packet of information or a message data-string which includes the address of the intended recipient that is unique for each intended recipient. The message data-string is converted to html-readable language and passed to a file handler via a user interface. The message data-string is stored while the instant invention locates one unoccupied call address, such as for example an http call address, if the message data-string is going to only one recipient. Otherwise, the instant invention recognizes that a plurality of unique call address are required and establishes one unique call address for storage of each copy of the email sent to the plurality of intended recipients. In the simplest case where there is one recipient, the message data-string is then posted to this unique unoccupied call address which is on a Web server. Concurrently, a notice that the recipient has email from the sender on the Web server at the call address at which the message data-string is located is sent to the recipient's Post Office Protocol (POP) server, notifying the recipient that they have an electronic communication. The recipient requests the message data-string located at the provided unique call address and it is sent to the recipient, who downloads it, opening it. Upon downloading of the message data-string, the instant invention generates a notice of receipt that is forwarded to the original sender. The notice of receipt forwarded to the sender at the sender's POP server includes information concerning the collection of the email by the recipient such as for example the address to which the email was downloaded, the time it was downloaded, and optionally, a compressed copy of the original message. When the sender enters their POP server, they receive the notification of receipt by the recipient.

When attachments accompany an email, each of the attachments and the email itself is provided with a unique call address. Each is collected separately by the intended recipient. The intended recipient may be notified of each separately or the intended recipient may be directed to the email call address which then provides the recipient with the unique call addresses of each of the attachments.

Notification of receipt of the email and attachments can be achieved in a variety of ways and may vary depending upon the number of recipients and the number of attachments sent. Notification can be sent as each unique recipient accesses each unique call address. Or, notification may be sent to the sender when the recipient has collected the email and all of its associated attachments. Or, where a plurality of recipients have been sent the same email, the sender may be notified only after all the recipients have retrieved their copies of the email. Preferably, in the notification of receipt, a copy of the electronic message as received by the recipient is included. This message may then be compared with the message sent to verify that the message was not garbled during transmission. Other options will be apparent to those skilled in the art.

The instant invention also may be inactivated without having to remove the software application off the computer hard disc. The instant software application is provided with the following switches: Override, Always On, and Switch. Override allows the user to substantially turn off the software application thus deactivating notification of receipt. "Always On" allows the user to send electronic communication which provides notification of receipt whenever the electronic communication is accessed. Switch provides a subroutine that reads the electronic communication before its is sent by the sender to determine if a receipt is being requested.

Modifications and variations can be made to the disclosed embodiments without departing from the subject and spirit of the invention as defined in the following claims. Such modifications and variations, as included within the scope of these claims, are meant to be considered part of the invention as described.

What is claimed is:

1. A method for verifying receipt by an intended recipient of an electronic communication generated by a sender comprising the following steps:
   a) sending an electronic communication comprising a data-string having an electronic address for the intended recipient;
   b) posting said data-string having said electronic address to a unique call address;
   c) providing the intended recipient with said unique call address at said electronic address;
   d) receiving at said call address a request, having said electronic address for the intended recipient therewith, to access said data string;
   e) comparing said electronic address in said request with said electronic address provided in said data-string and proceeding with accessing said data string when said electronic address in said request matches said electronic address in said data-string;
   f) sending an electronic notification consisting of data, said data comprising said call address and said electronic address of the intended recipient to the sender when said electronic communication is accessed by the intended recipient.

2. The method as in claim 1, further comprising the step of posting said data in a back end database.

3. A method for verifying receipt by an intended recipient of an electronic communication generated by a sender comprising the following steps:
   a) sending an electronic communication comprising a data-string having an electronic address for the intended recipient;
   b) sending an attachment to said electronic communication to an additional electronic address for the intended recipient;
   c) posting said data-string having said electronic address to a unique call address;
   d) posting said attachment having said additional electronic address to an additional unique call address;
   e) providing the intended recipient with said unique call address at said electronic address;
   f) receiving at said call address a request, having said electronic address for the intended recipient therewith, to access said data-string;
   g) comparing said electronic address in said request with said electronic address provided in said data-string and proceeding with accessing said data string when said electronic address in said request matches said electronic address in said data-string; and
   h) sending an electronic notification consisting of data, said data comprising said call address and said electronic address of the intended recipient to the sender when said electronic communication is accessed by the intended recipient.

4. The method as in claim 3, further comprising the step of posting said data in a back end database.

5. A device for verifying receipt by an intended recipient of an electronic communication generated by a sender comprising the following steps:
   a) means for sending an electronic communication comprising a data-string having an electronic address for the intended recipient;
   b) means for posting said data-string having said electronic address to a unique call address;
   c) means for providing the intended recipient with said unique call address at said electronic address;
   d) means for receiving at said call address a request, having said electronic address for the intended recipient therewith, to access said data string;
   e) means for comparing said electronic address in said request with said electronic address provided in said datastring and proceeding with accessing said data string when said electronic address in said request matches said electronic address in said datastring; and
   f) means for sending an electronic notification consisting of data, said data comprising said call address and said electronic address of the intended recipient to the sender when said electronic communication is accessed by the intended recipient.

6. A device for verifying receipt by an intended recipient of an electronic communication generated by a sender comprising the following steps:
   a) means for sending an electronic communication comprising a data-string having an electronic address for the intended recipient;
   b) means for sending an attachment to said electronic communication to an additional electronic address for the intended recipient;
   c) means for posting said data-string having said electronic address to a unique call address;
   d) means for posting said attachment having said additional electronic address to an additional unique call address;

e) means for providing the intended recipient with said unique call address at said electronic address;

f) means for receiving at said call address a request, having said electronic address for the intended recipient therewith, to access said data-string;

g) means for comparing said electronic address in said request with said electronic address provided in said datastring and proceeding with accessing said data string when said electronic address in said request matches said electronic address in said datastring; and h) means for sending an electronic notification consisting of data, said data comprising said call address and said electronic address of the intended recipient to the sender when said electronic communication is accessed by the intended recipient.

* * * * *